No. 655,818. Patented Aug. 14, 1900.
H. A. WILLIAMS.
MACHINE FOR FINISHING HORSESHOE NAILS.
(Application filed Apr. 12, 1900.)
(No Model.) 12 Sheets—Sheet 1.

Fig. 1.

WITNESSES.
Henry Marsh.
Lillian I. Basford.

INVENTOR.
Henry Alexis Williams,
by Fischemacher
Atty

No. 655,818. Patented Aug. 14, 1900.
H. A. WILLIAMS.
MACHINE FOR FINISHING HORSESHOE NAILS.
(Application filed Apr. 12, 1900.)
(No Model.) 12 Sheets—Sheet 3.

WITNESSES
R. Henry Marsh.
Lillian I. Basford.

INVENTOR
Henry Alexis Williams,
by F. E. Teschemacher
Atty

No. 655,818. Patented Aug. 14, 1900.
H. A. WILLIAMS.
MACHINE FOR FINISHING HORSESHOE NAILS.
(Application filed Apr. 12, 1900.)
(No Model.) 12 Sheets—Sheet 4.

WITNESSES
J. Henry Marsh.
Lillian J. Basford.

INVENTOR
Henry Alexis Williams.
by ...
Atty.

No. 655,818. Patented Aug. 14, 1900.
H. A. WILLIAMS.
MACHINE FOR FINISHING HORSESHOE NAILS.
(Application filed Apr. 12, 1900.)

(No Model.) 12 Sheets—Sheet 6.

No. 655,818. Patented Aug. 14, 1900.
H. A. WILLIAMS.
MACHINE FOR FINISHING HORSESHOE NAILS.
(Application filed Apr. 12, 1900.)
(No Model.) 12 Sheets—Sheet 8.

No. 655,818. Patented Aug. 14, 1900.
H. A. WILLIAMS.
MACHINE FOR FINISHING HORSESHOE NAILS.
(Application filed Apr. 12, 1900.)
(No Model.) 12 Sheets—Sheet 9.

No. 655,818. Patented Aug. 14, 1900.
H. A. WILLIAMS.
MACHINE FOR FINISHING HORSESHOE NAILS.
(Application filed Apr. 12, 1900.)

(No Model.) 12 Sheets—Sheet 10.

Witnesses
Inventor
Henry Alexis Williams

No. 655,818. Patented Aug. 14, 1900.
H. A. WILLIAMS.
MACHINE FOR FINISHING HORSESHOE NAILS.
(Application filed Apr. 12, 1900.)
(No Model.) 12 Sheets—Sheet 11.

UNITED STATES PATENT OFFICE.

HENRY ALEXIS WILLIAMS, OF QUINCY, MASSACHUSETTS, ASSIGNOR TO THE PUTNAM NAIL COMPANY, OF BOSTON, MASSACHUSETTS.

MACHINE FOR FINISHING HORSESHOE-NAILS.

SPECIFICATION forming part of Letters Patent No. 655,818, dated August 14, 1900.

Application filed April 12, 1900. Serial No. 12,590. (No model.)

*To all whom it may concern:*

Be it known that I, HENRY ALEXIS WILLIAMS, a citizen of the United States, residing at Quincy, in the county of Norfolk and State of Massachusetts, have invented certain Improvements in Machines for Finishing Horseshoe-Nails, of which the following is a specification.

My invention relates to machines for finishing partially-made horseshoe-nails; and it consists in a machine provided with an intermittently-revolving carrier-disk of novel construction provided around its periphery with a series of dies for holding the partly-finished nails in position while being successively operated upon by coöperating reciprocating dies arranged around the circumference of said carrier-disk for forming a perfect head, scarfing or beveling the shank at the point, and trimming off the surplus metal to form the point, all as hereinafter fully described, whereby a better formed and finished nail is produced at a much greater speed than heretofore.

My invention also consists in certain novel features, details of construction, and combinations of parts, as will be hereinafter more particularly described, and pointed out in the claims.

In the accompanying drawings, Fig. 19 is a perspective view of the reciprocating die which coöperates with each of the dies of the rotary disk to hold the nail while being headed, the vertical reciprocating heading-die being shown in dotted lines.

In the said drawings, A represents the bed-plate of the machine, to the rear end of which is bolted an upwardly-extending head or frame B.

C is the driving-shaft, carrying at one end the driving-pulley D and fly-wheel E and at its opposite end a pinion 40, which meshes with and drives a large gear G on one end of a shaft 41, having its bearings in the sides of the head B. The gear G is loose on the shaft 41 and is thrown into and out of connection therewith by means of a suitable clutch operated by a foot-lever. (Not shown.) To the shaft 41 is secured a small gear 43, which meshes with and drives a similar gear 44, Fig. 16, secured to a shaft 45, parallel with the shaft 41 and also having its bearings in the sides of the head B.

Figure 1:
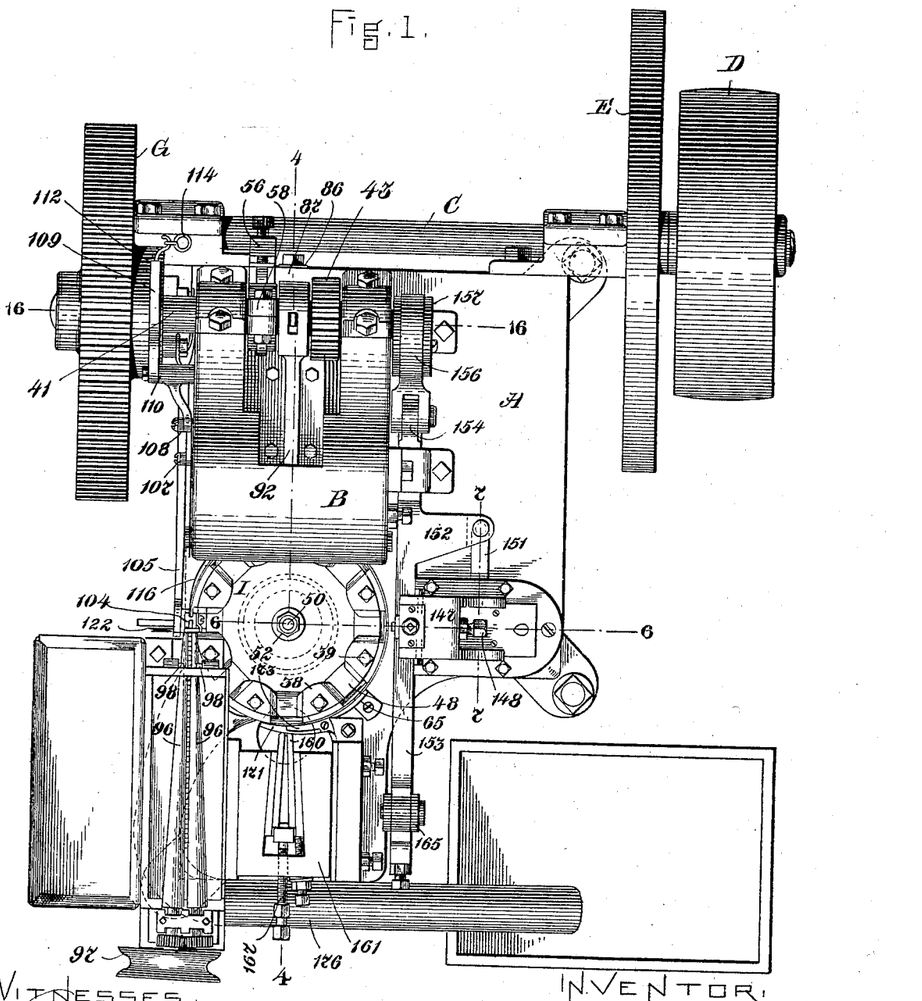
Figure 1 is a plan view of my improved machine for finishing horseshoe-nails.
Figures 4, 17, 20:
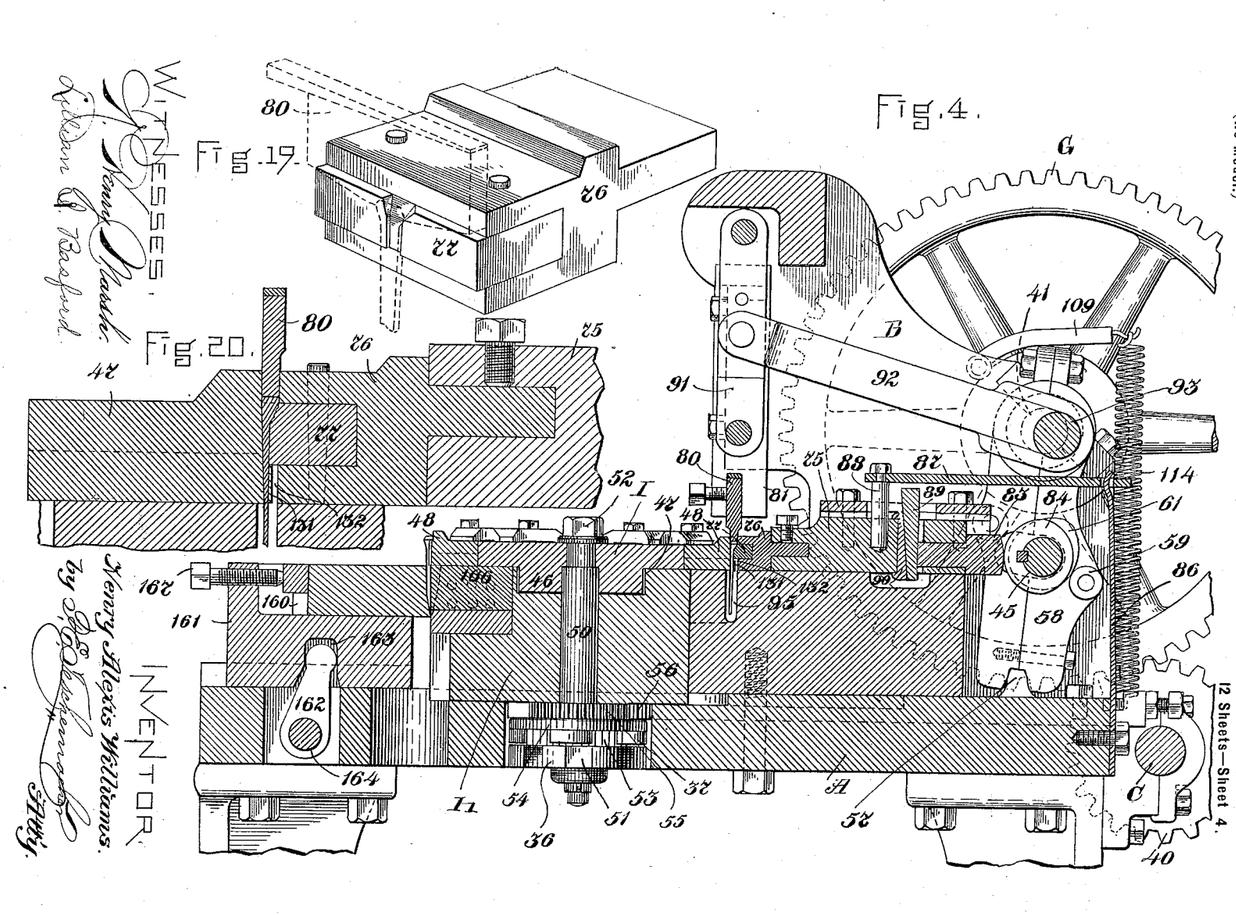
Fig. 4 is an enlarged vertical section of the same on the line 4 4 of Fig. 1.
Fig. 17 is a horizontal section on the line 17 17 of Fig. 9.
Fig. 20 is a sectional detail showing the dies in the act of heading the nail.
Figures 5, 26, 27, 28, 29, 30:
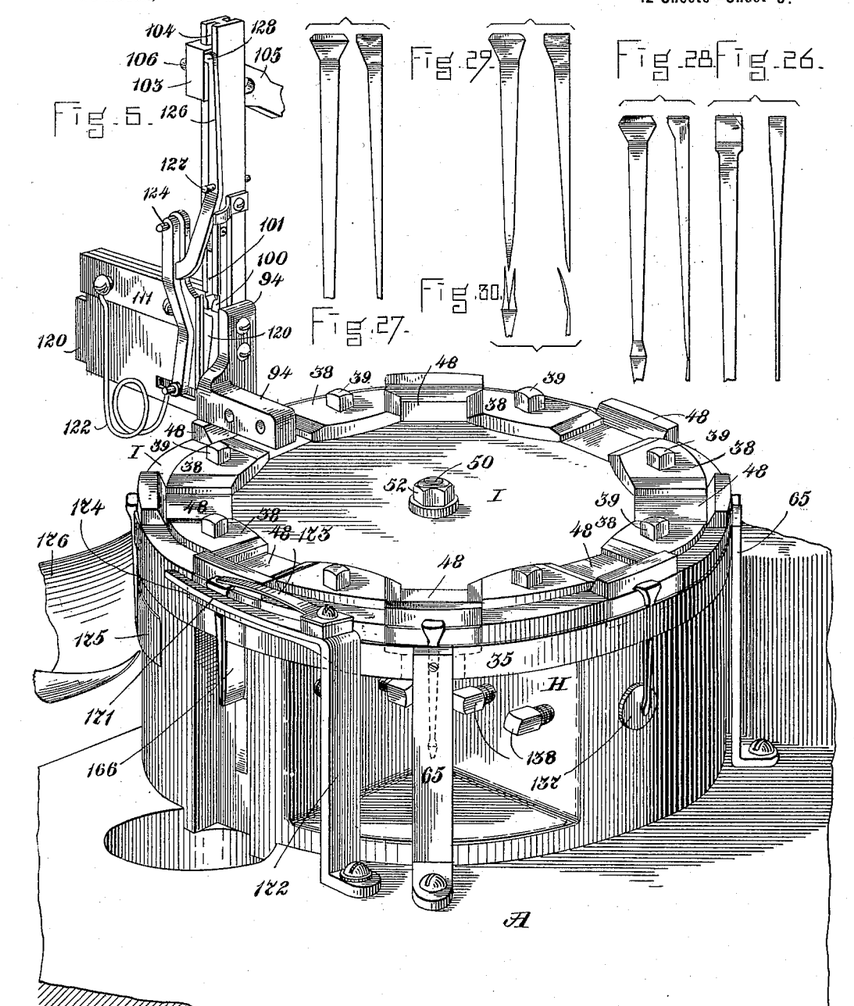
Fig. 5 is a perspective view of the rotary die-carrying disk and parts adjacent thereto, showing the devices for holding the nails in position within the dies of the disk and discharging the nails therefrom when finished.
Figs. 26, 27, 28, and 29 represent in front and side elevation the nail in different stages of completion.
Fig. 30 represents the surplus portion of the nail sheared off by the trimming-die in the operation of forming the point.
Figures 7, 8, 21, 22:
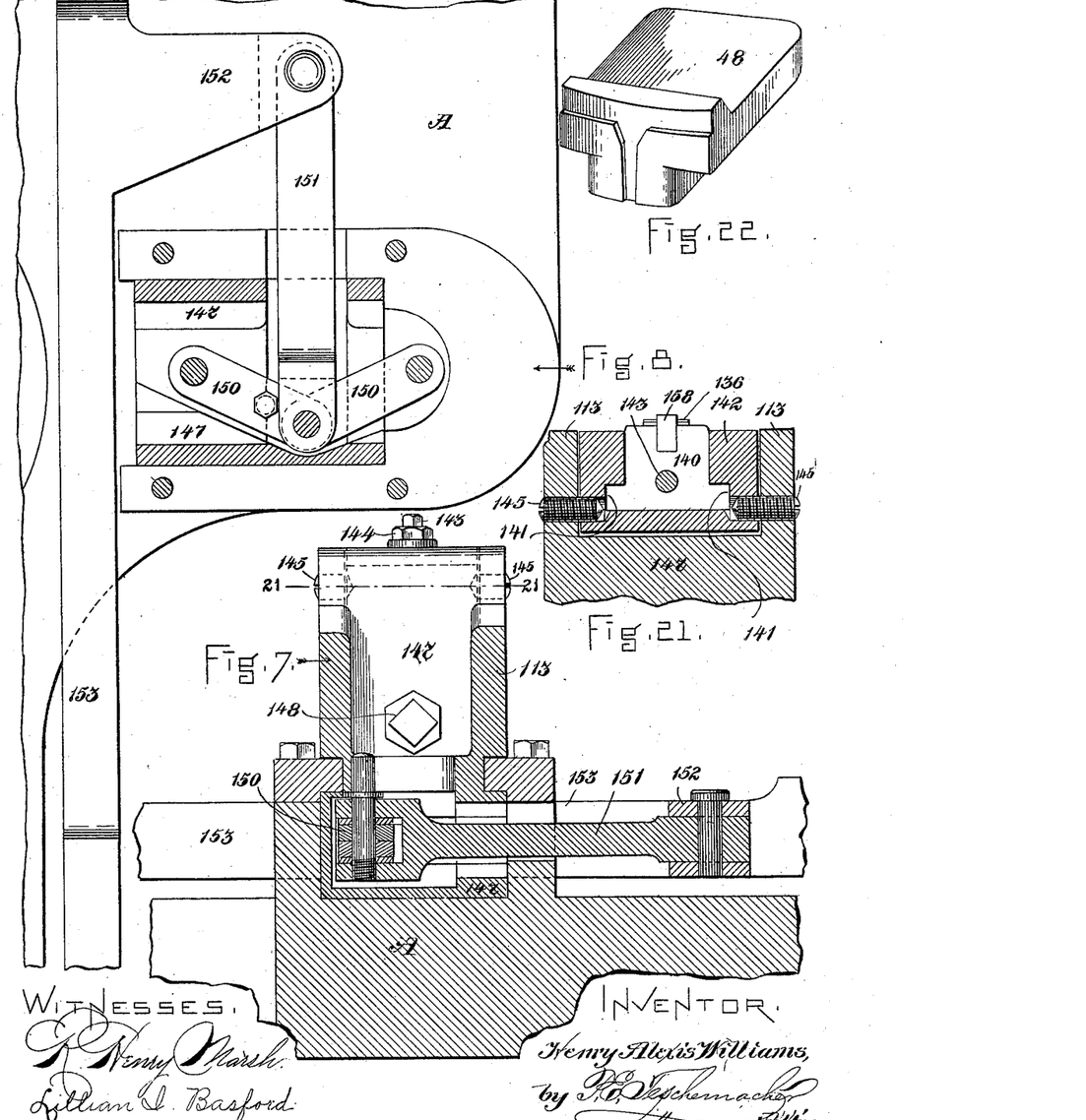
Fig. 7 is an enlarged vertical section on the line 7 7 of Fig. 1.
Fig. 8 is a horizontal sectional plan on the line 8 8 of Fig. 2, showing the toggle mechanism for actuating the scarfing-die.
Fig. 21 is an enlarged horizontal section on the line 21 21 of Fig. 7.
Fig. 22 is a perspective view of one of the die-blocks of the rotary disk.
Figures 15, 17, 18:
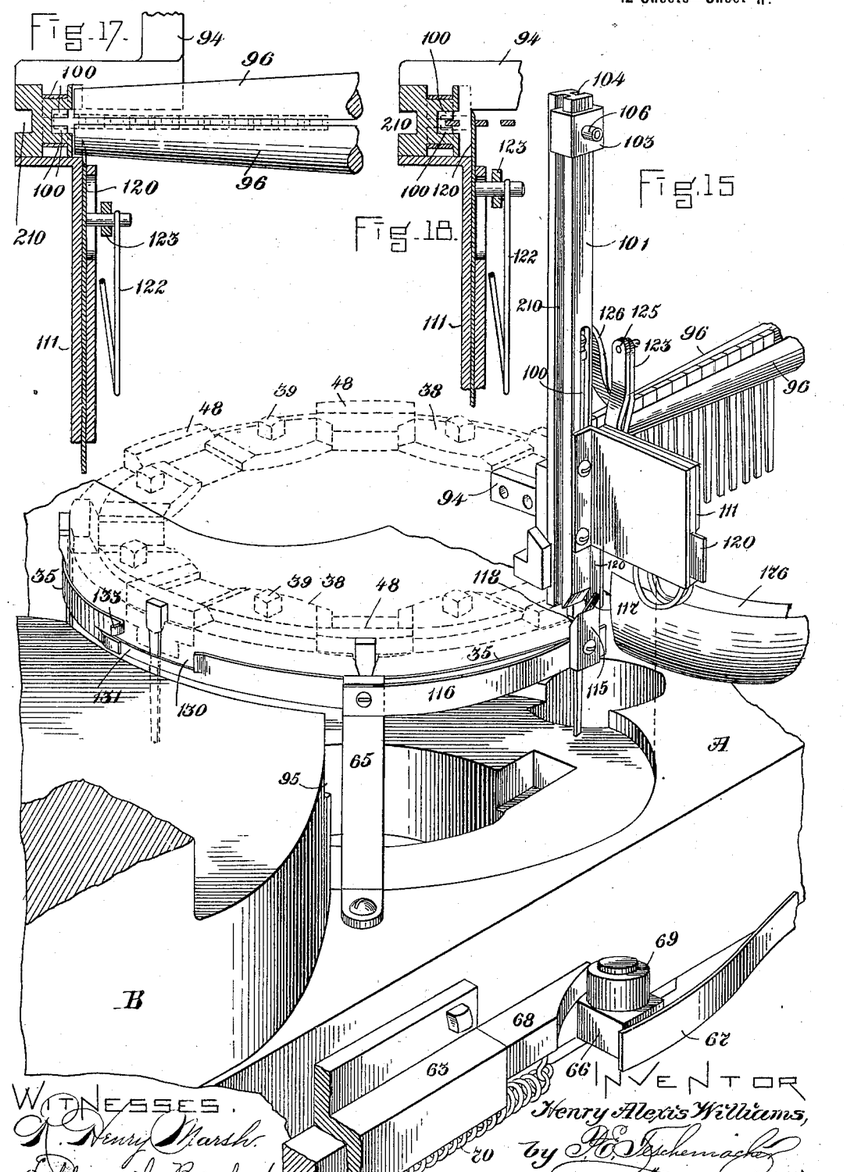
Fig. 15 is a perspective view showing a portion of the machine, taken from the side shown in Fig. 14, the die-carrying disk and its dies being shown in dotted lines.
Fig. 18 is a similar section on the line 18 18 of Fig. 10.

To the front portion of the bed-plate A is bolted a cylindrical block or base H, upon which is placed a horizontal intermittently-rotating die-carrying disk I, provided on its under side with a central hub 46, fitting within a recess 47 at the center of the base H, said disk being provided around its periphery with a series of removable half-dies 48, Figs. 1, 4, and 22, of proper form to receive the upper portion of a partly-finished nail, Figs. 15 and 26, and secured in place by overlapping plates 38 and suitable bolts or screws 39.

Figure 16:
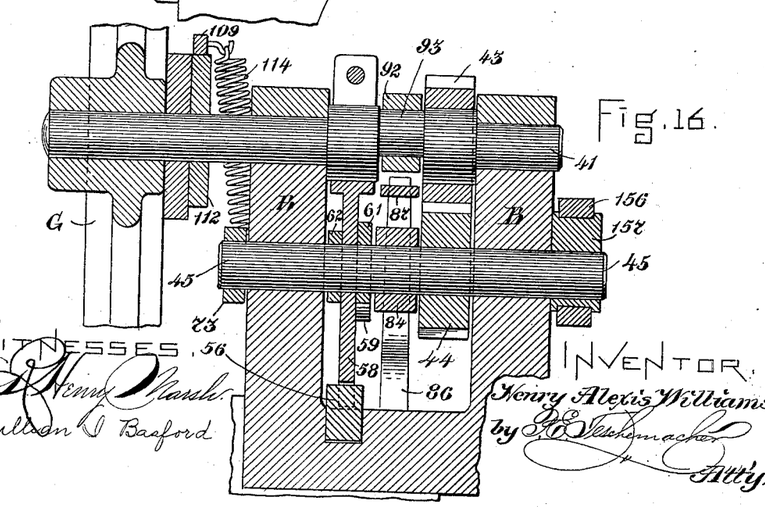
Fig. 16 is an enlarged vertical section on the line 16 16 of Fig. 1.
Figure 23:
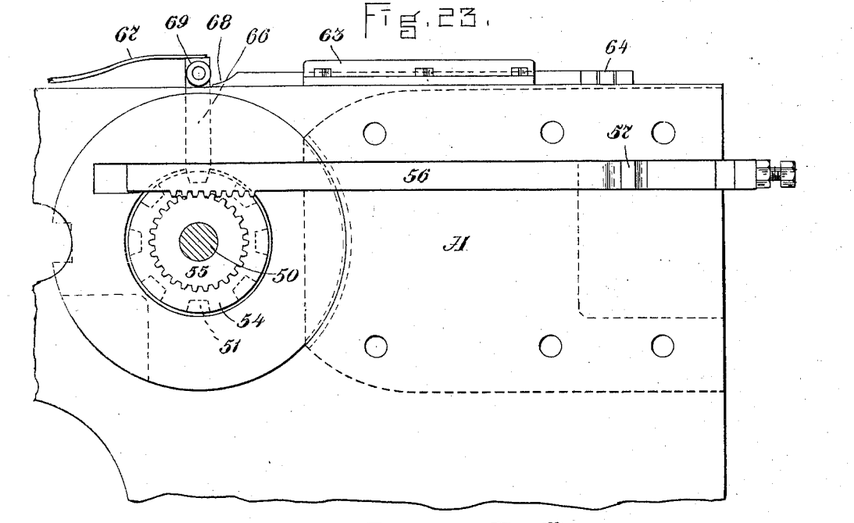
Fig. 23 is a plan of a portion of the bed of the machine, illustrating a portion of the mechanism for rotating the die-carrying disk and locking it in position.
Figure 24:
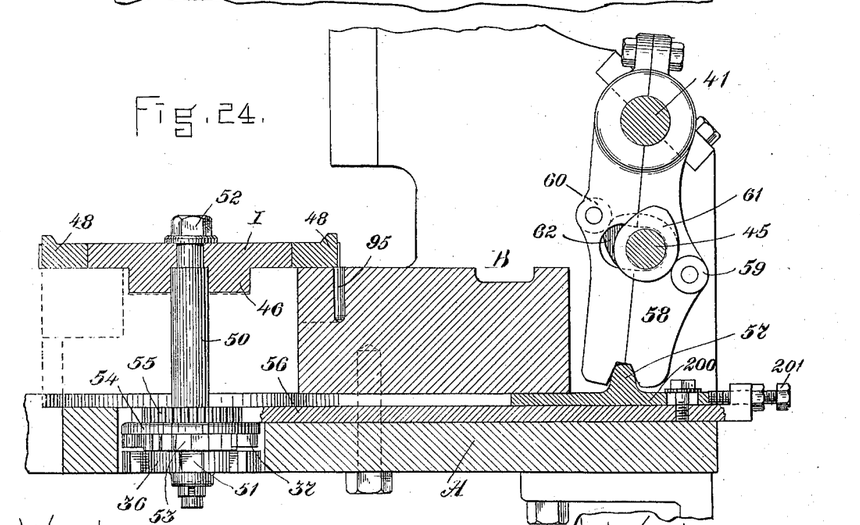
Fig. 24 is a vertical section of a portion of the machine, illustrating other portions of the mechanism for rotating the die-carrying disk.

50 is a vertical spindle extending up through the center of the disk I, to which it is secured by a nut 52, said spindle extending down through a central aperture in the block H, which forms a bearing therefor. This spindle has secured to its lower portion a ratchet-wheel 53, having a number of teeth equal to the number of half-dies 48 on the disk I, said wheel being engaged by a series of spring-pressed pawls 37, Fig. 4, mounted on a disk 54, loose on the spindle 50, and having secured to it a gear 55, which is engaged by a reciprocating rack-bar 56, sliding in a guide-groove in the bed A, as shown in Figs. 23 and 24, and provided at its rear end with an adjustable bar 200, having an upwardly-projecting tooth 57, which is embraced by the bifurcated lower end of a depending slotted rocker-arm 58, hung on the shaft 41, and provided on its opposite sides with anti-friction-rolls 59 60, which are alternately acted upon by cams 61 62 on the shaft 45, as shown in Figs. 4, 16, and 24, to move said rocker-arm forward and back, and thus through the medium of the mechanism described intermittently rotate the disk I a distance equal to that between two of its adjacent dies 48. The bar 200 is made adjustable by means of a screw 201, whereby the bar 56 may be moved forward or back, so that each half-die 48 may be brought into the exact position required. To the lower end of the spindle 50 is secured a disk 36, provided at its periphery with a series of tapering notches 51, Fig. 4, equal in number to the dies 48, one of said notches being engaged after each intermittent movement of the disk I by the tapering end of a horizontal locking-bar 66, which slides in a guide-groove in the bed-plate A and is forced inward by a flat spring 67 to engage said notch, and thus center and lock the disk I in the exact position required.

Figure 14:
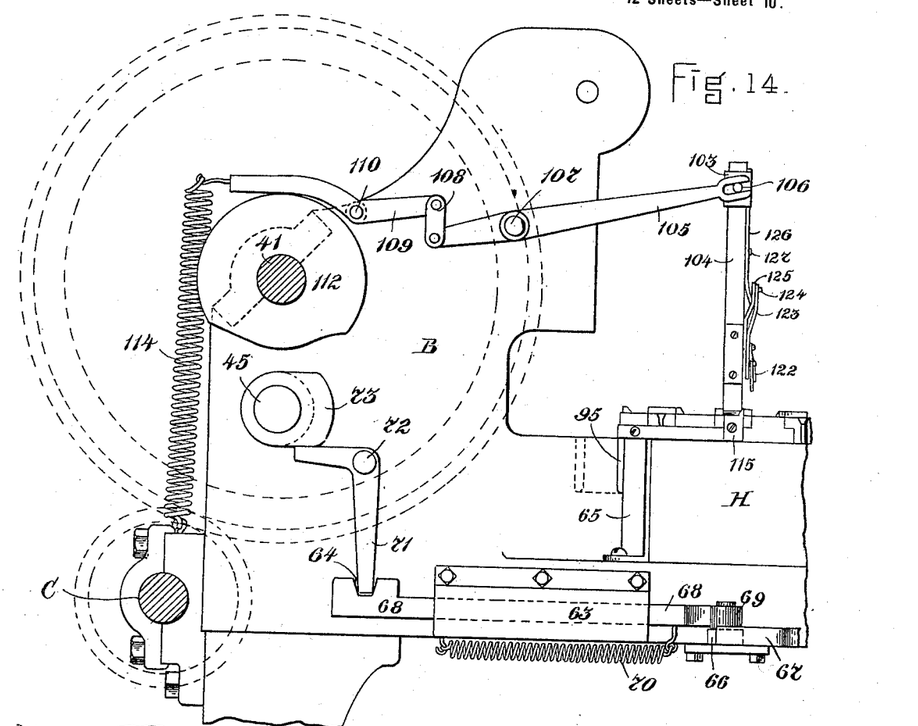
Fig. 14 is an elevation of a portion of the side of the machine opposite to that shown in Fig. 2, illustrating the mechanism for actuating the nail-pushing device within the nail-conductor.

The locking-bar 66 is forced outward against the resistance of the spring 67 to release the disk I before its next intermittent movement by the wedge-shaped end of a bar 68, which slides in a suitable guide 63 and acts on an antifriction-roll 69 at the outer end of the bar 66, said bar 68 being pushed forward against the resistance of a spring 70 by a bell-crank 71 taking into a notch 64 therein and fulcrumed at 72, said bell-crank being acted upon by a cam 73 on the shaft 45, as shown in Fig. 14.

The partly-finished nails, Fig. 26, which are successively placed within the half-dies 48 of the disk I in a manner to be presently described, are held in place while being successively operated upon by heading, scarfing, and pointing dies, to be hereinafter described, by means of a thin steel band 35, preferably made in two parts, which partially encircles the disk I, as shown in Figs. 1, 5, and 15, and is supported on posts or brackets 65, said band lying close against the faces of the dies 48, so as to keep the nails securely within the die-recesses while being carried around with the disk I.

Within the head B is placed within suitable guides a horizontal reciprocating slide 75, arranged at right angles to the axis of revolution of the die-carrier I and having secured to its front end a removable piece 76, to the front face of which is secured a removable half-die 77, Figs. 4, 19, and 20, which is adapted to be brought by the action of the slide 75 firmly up against each half-die 48 as the latter is brought into line therewith by the intermittent movement of the disk I. The half-die 77 is the counterpart of the half-dies 48 and is adapted to coöperate therewith in holding the nail, the two half-dies 48 77 engaging the upper portion of the shank of the nail and the lower half of its head, as shown in Figs. 4 and 20, and holding it while being acted upon by a vertically-reciprocating heading-die 80, removably secured to a slide 81, moving in a suitable guideway in the head B. The die 80 is formed to shape the upper half of the head of the nail and in its descent upsets the metal, forming with the coöperating half-dies 48 77 a perfect head.

The slide 75 is provided at its rear end with a removable steel bearing-piece 83, Fig. 4, against which bears a cam 84 on the shaft 45, whereby the slide is advanced at the proper time against the resistance of a stiff spring 86, which is connected with the slide 75 by a horizontal bar 87 and post 88.

A wedge or key 89 and gib 90, passing through a slot in the slide 75, act to push out the bearing-piece 83 to take up or compensate for any wear between it and the cam 84 or to adjust the die 77 forward or back with relation to the half-die 48. The vertical heading-die slide 81 is actuated at the required time by a toggle 91, to which is pivoted a rod or bar 92, the opposite end of which is connected with and reciprocated by a crank 93 on the shaft 41, as shown in Fig. 4.

In the bed A is formed a curved groove 95, Figs. 4 and 15, into which extends the lower portion of the shank of the nail and through which it passes as it is carried around in the die.

I will now describe the manner in which the nails are placed within the half-dies 48 of the intermittently-revolving carrier-disk I.

Figures 9, 10:
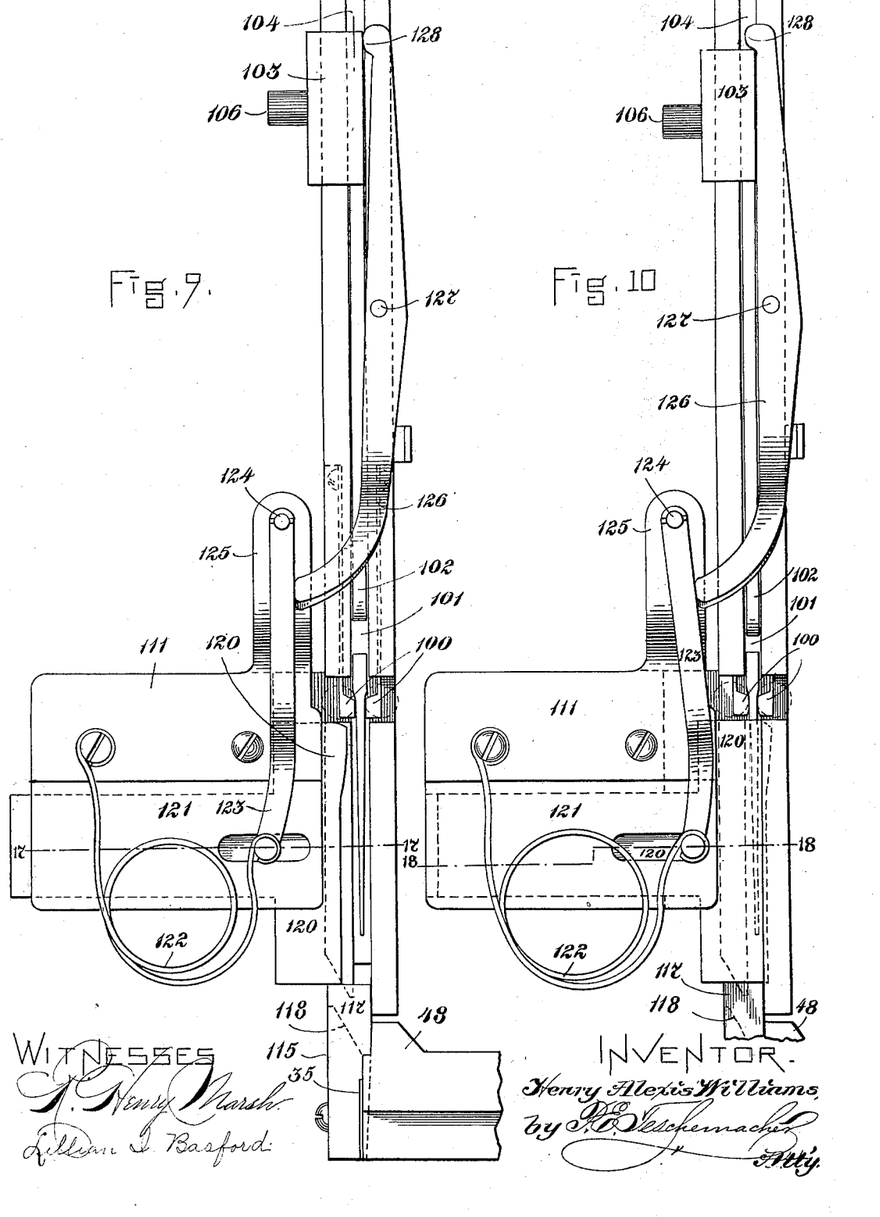
Fig. 9 is an elevation of the nail-conductor and parts connected therewith, the nail being shown held suspended by the spring-jaws of the conductor.
Fig. 10 is a similar elevation with the parts in a different position.
Figures 11, 12, 13:
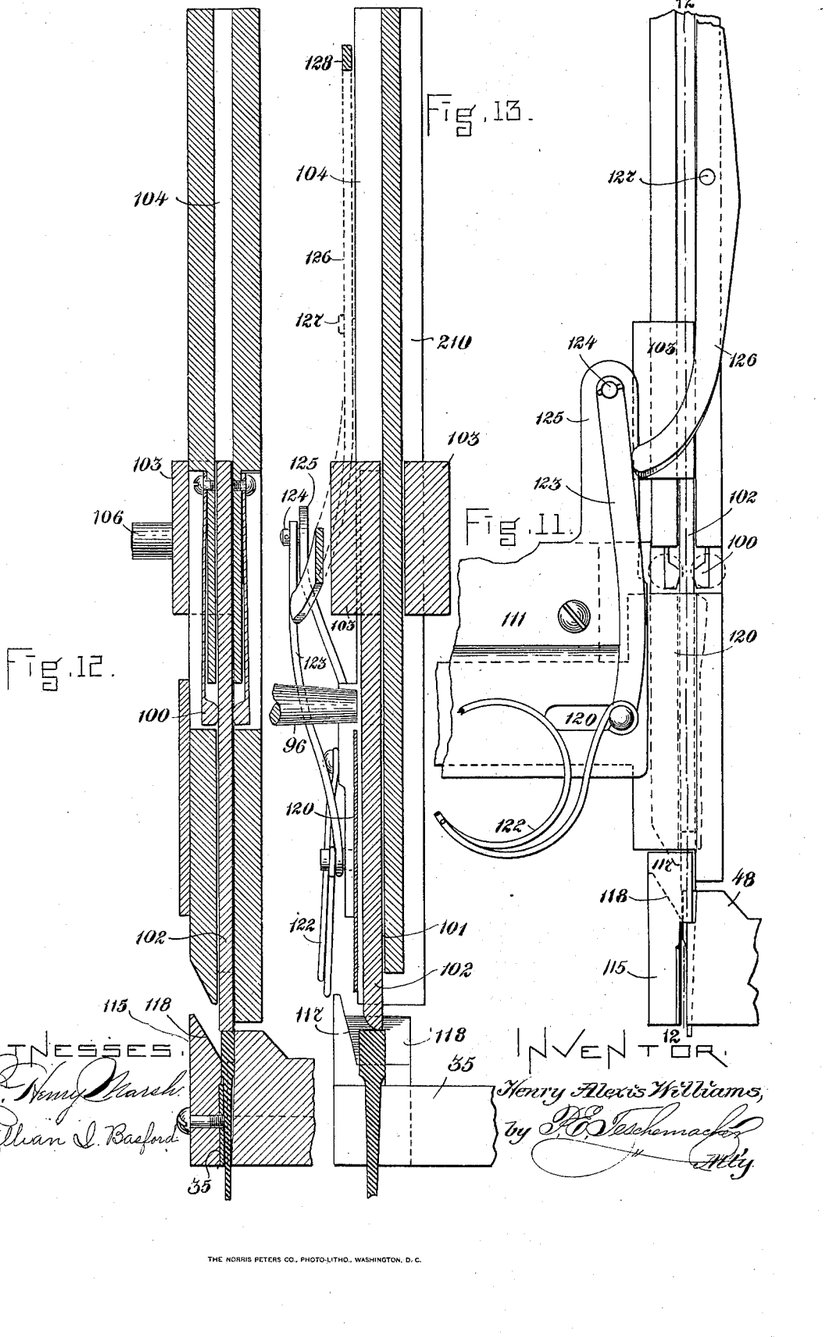
Fig. 11 is a similar elevation showing the parts in the position which they occupy when the nail has been pushed down into one of the dies of the carrying-disk.
Fig. 12 is a vertical section through the nail-conductor on the line 12 12 of Fig. 11.
Fig. 13 is a vertical section of the nail-conductor, taken in a plane at right angles to that shown in Fig. 12.

96 96 are a pair of long tapering feed-rolls which are geared to revolve together, one being provided with a pulley 97, over which may pass a driving-belt. (Shown in dotted lines in Fig. 2.) These rolls, which form a raceway, are arranged in an inclined position and at such distance apart as to leave a narrow space between them a little more than sufficient to accommodate the shanks of the nails when turned with their wider flat sides parallel with the rolls, as shown in Figs. 15 and 17, the nails when between these rolls being supported by their heads and being fed forward in a pendent position by the rotation of said rolls, the direction of rotation of which is upward and outward from each other. The lower ends of the rolls 96 are supported in journal-boxes 98, Figs. 1 and 2, open on the inner side, thereby preventing any interruption of the space between said rolls, which forms the passage for the nails. Each nail as it leaves the end of the raceway passes between two spring-jaws 100, located within a vertical conductor 101, supported by a suitable bracket 94, said jaws serving to hold the nail suspended, as shown in Figs. 9 and 10, ready to be forced down into one of the half-dies 48 beneath as soon as the latter is brought around into position to receive it by a sliding nail-pusher 102, which fits a groove 104 in the side of the conductor 101 and is connected with a reciprocating slide 103, moving in said groove 104, and a guide-groove 210 on the opposite side of said conductor and actuated by a lever 105, the outer slotted end of which embraces a pin 106, projecting from the slide. The lever 105 is fulcrumed at 107, Fig. 14, and connected by a link 108 with a lever 109, fulcrumed at 110 and acted on by a cam 112 on the shaft 41 to raise the slide and nail-pusher against the resistance of a spring 114, the latter acting to depress the slide and cause the nail-pusher to force the nail down through the spring-jaws 100 of the nail-conductor into the half-die 48 beneath, as shown in Figs. 11, 12, and 13. Directly beneath the conductor 101 is placed a guide 115, Figs. 9, 10, 11, 12, 13, 14, and 15, which is secured to the end of the flat band 35, which at this point lies close against the face of the half-die 48, thus closing the open side of the die-recess therein. A spring 116 bears against and reinforces the end of the band 35, keeping it close against the die 48 and the disk I. The guide 115 has two inwardly and downwardly inclined sides 117 118 at right angles to each other, which serve to guide the point of the nail directly into the die-recess and prevent any possibility of the nail getting between the face of the die-block and the band 35, the latter yielding outward as the nail is fully pushed into the die by the descent of the nail-pusher 102 and holding it in place therein with a yielding or spring pressure. After the nail passes into the conductor 101 between the spring-jaws 100 it is separated or cut out from the line of nails behind it by a horizontally-reciprocating slide or plate 120, which moves in a suitable guideway 121 and is carried forward at the proper time transversely across the line of pendent nails in the raceway beneath their heads by a spring 122, so as to pass between the two nails under their heads, as shown in Figs. 10 and 18, where there is always sufficient space for its passage. This slide 120 thus holds back the entire line of nails in the raceway until the nail in the conductor has been pushed into the half-die beneath and the pusher 102 has again risen to the position shown in Fig. 9, when the slide is withdrawn to permit the next nail to pass into the nail-conductor. The slide 120 is drawn back away from the end of the raceway against the resistance of the spring 122 to permit the next nail to enter the nail-conductor by a lever 123, fulcrumed at 124 to an upright 125, secured to a plate 111, projecting from the side of the conductor. The lever 123 is acted upon by the lower end of another lever 126, fulcrumed at 127 to the conductor 101 and provided at its upper end with a projection 128, which is struck by the slide 103 as it approaches the top of the conductor in its upward movement, when the bottom of the nail-pusher will be above the spring-jaws 100, leaving the way clear for the entrance of the next nail. As soon as the nail-pusher slide 103 begins to descend it passes out of contact with the projection 128, as shown in Fig. 10, thus releasing the lever 126, when the cut-off slide 120 will be instantly pushed forward by its spring 122 to cut out or separate the nail which has just passed into the spring-jaws of the conductor from the line of nails in the raceway behind it. The nail-pusher then descends and forces the nail down through the yielding spring-jaws 100 and guide 115 into its position in the half-die 48 of the carrier-disk I beneath, as shown in Figs. 11, 12, and 13, ready to be carried around into position to be headed by the heading-die 80, as previously described.

The spring-band 35, which holds the nails while being carried around in the dies 48 and which is preferably made in two portions, as shown in Fig. 15, is cut away at 130, leaving a narrow portion 131 at the bottom at a point opposite to the horizontal reciprocating die 77 in order to allow the latter to inclose the upper portion of the nail, said narrow portion 131 lying in the space 132 beneath the die 77, which permits the two die-blocks 48 77 to come into close contact with each other, as shown in Figs. 4 and 20, while the nail is still held by the spring-band 35. The adjacent end of the adjoining portion of the band 35, near the end of the narrow portion 131, is turned outward at 133, Fig. 15, so as to present a curved surface, forming a guide, which prevents any possibility of the edge of the shank of the nail catching the end of the band as it is carried around in the die-block after being headed.

Figure 6:
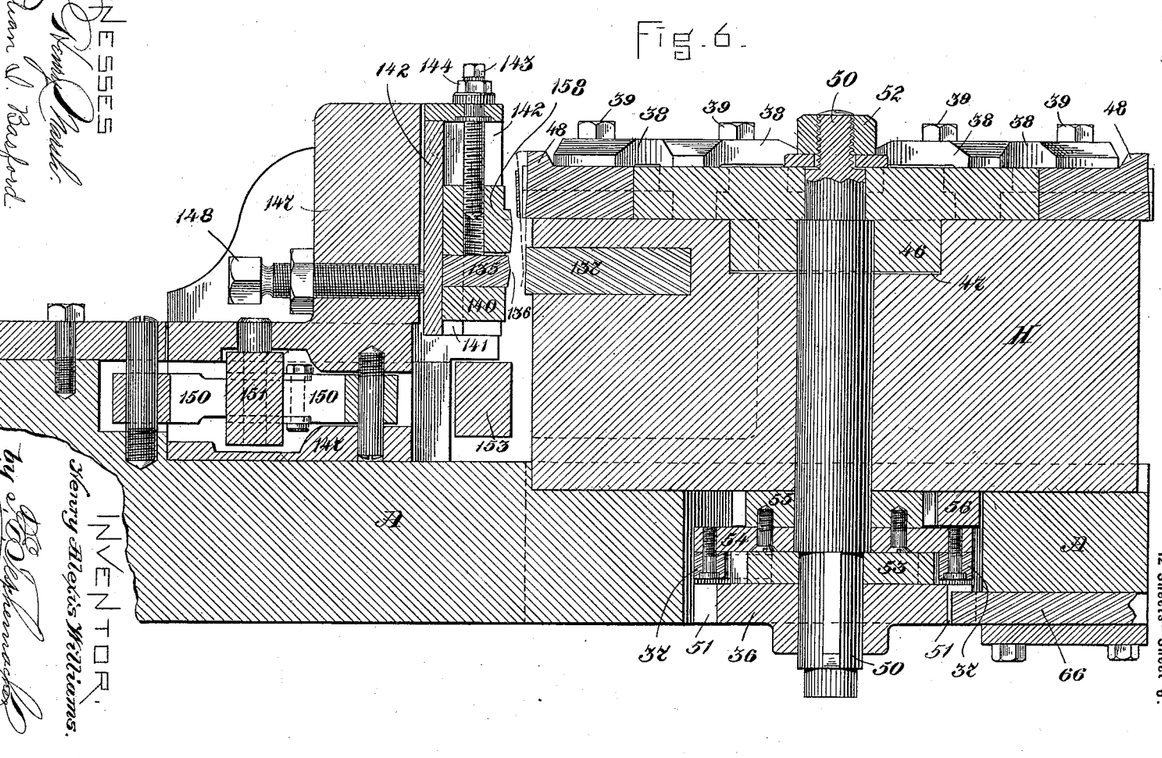
Fig. 6 is an enlarged vertical section of the rotary die-carrying disk on the line 6 6 of Fig. 1.

As the disk I revolves, the nails after being headed are carried around in their half-dies 48 inside the band 35 to be successively acted upon by scarfing and trimming dies, the nails being held by the band 35 with their shanks hanging down outside the base H, as shown in Figs. 5 and 6. Each nail as the disk I revolves is brought in succession into line with a reciprocating die 135, having its face inclined in both directions toward the center, forming a sharp horizontal edge 136, as shown in Fig. 6. This die 135 coöperates with a removable member or anvil 137, inserted within a recess within the base H and held in place by set-screws 138, Fig. 5, said die 135 serving to form the scarf or bevel at the point of the nail, as shown in Fig. 6. The die 135 is secured within a suitable recess in a slide 140, which is made adjustable vertically within guide-grooves 141 in a frame or holder 142 by means of a screw 143, provided with a clamping-nut 144. The holder 142 is pivoted at its upper end by means of screws 145, as shown in Figs. 7 and 21, between the upright side pieces or cheeks 113 of a head forming the upper portion of a horizontally-reciprocating slide 147 and is made adjustable toward and away from the anvil 137 by means of a screw 148, bearing against the back of the holder 142 near its lower end, as shown in Fig. 6. By thus making the scarfing-die 135 adjustable vertically its distance from the head of the nail can be changed, whereby the position of the scarf can be varied to form a long or a short nail, as may be required, while the capability of moving the die 135 toward and from the anvil 137 by means of the screw 148 enables me to nicely adjust said die for nails of different thicknesses. Furthermore, the adjusting-screws 143 148 are both located outside in easily-accessible positions, so that the adjustments can be easily and quickly effected without removing any portion of the machine or while the machine is in operation, if desired, which is a very great advantage in machines of this character, as it effects a material saving in time and labor.

Figure 2:
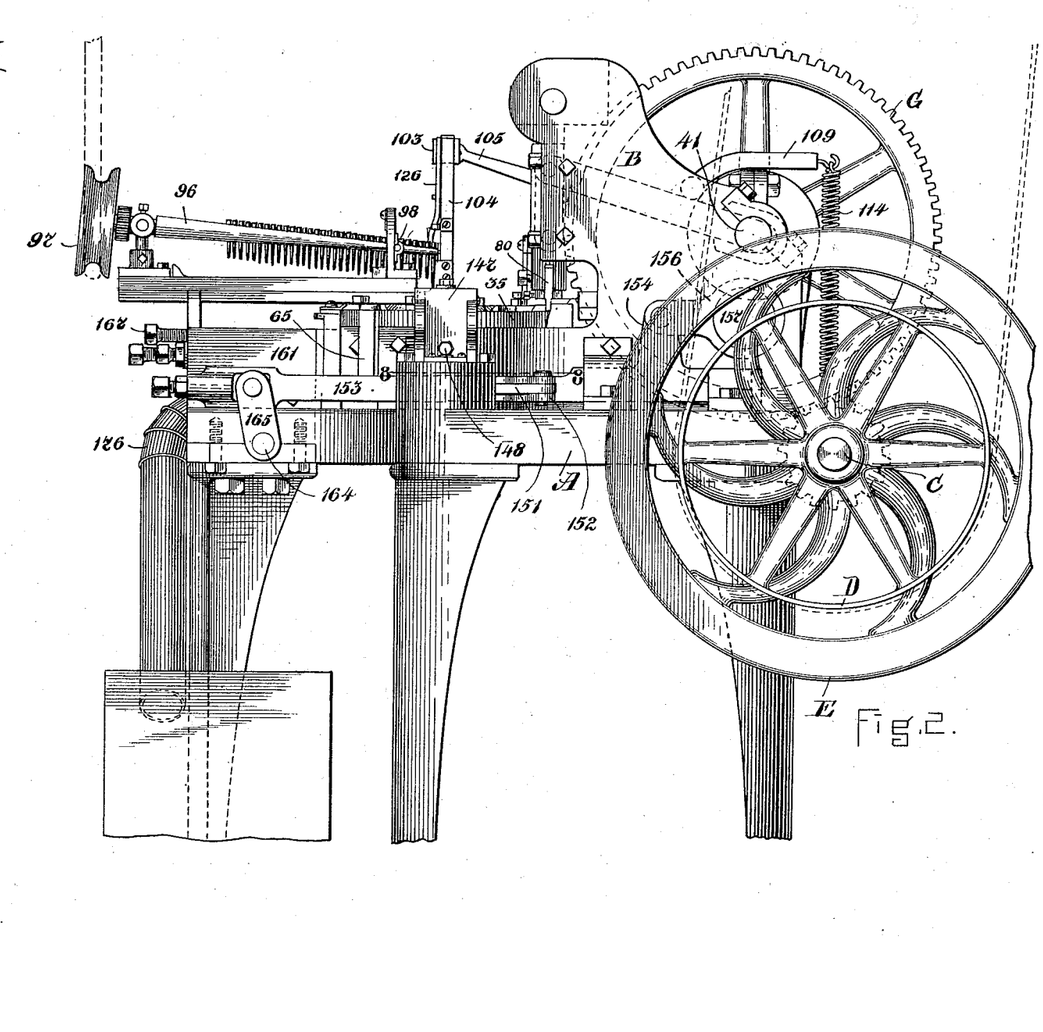
Fig. 2 is an elevation of one side of the same.
Figures 3, 25:
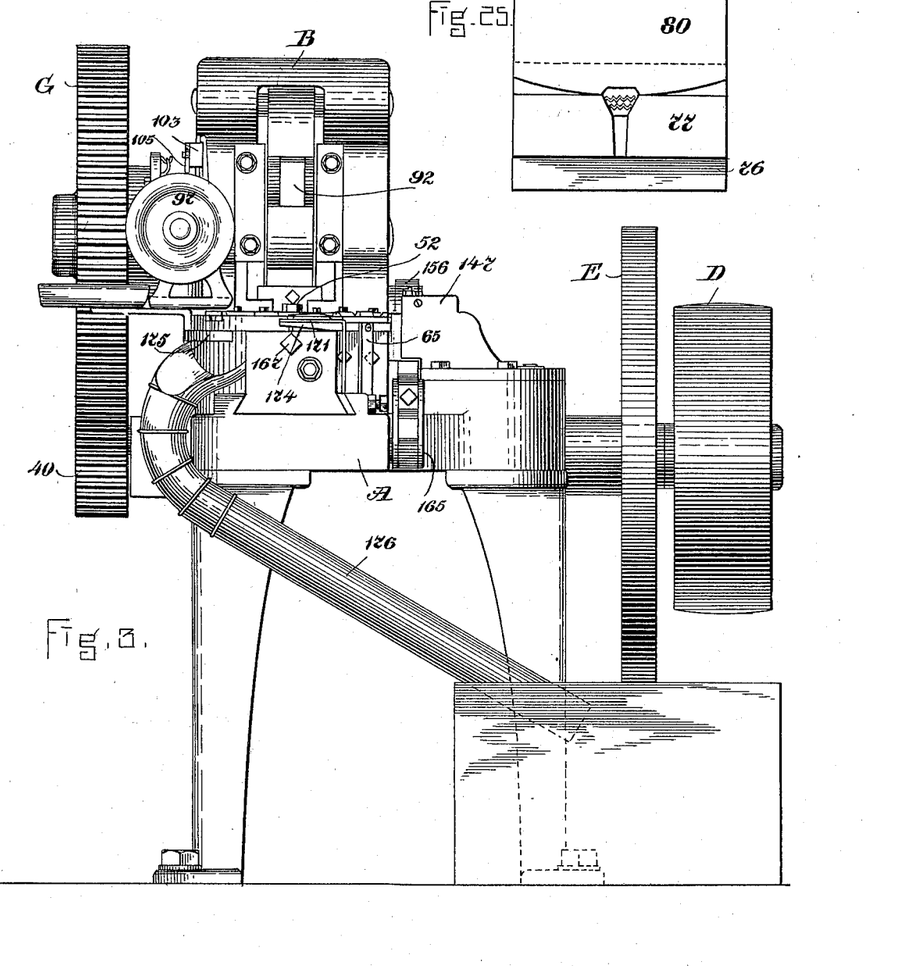
Fig. 3 is a front elevation of the machine.
Fig. 25 is a front elevation of the vertically-reciprocating heading-die and the horizontal reciprocating die which coöperates therewith, showing the nail in place therein.

The slide 147 moves in a suitable guideway in the bed A and is reciprocated toward and from the base H by means of a toggle 150, to which is pivoted a bar 151, Figs. 6, 7, and 8, the opposite end of which is pivoted to a lateral projection 152 on a long horizontal bar 153, which slides in suitable guides on the bed A and is provided with an upright projection 154, connected by an eccentric-strap 156 with an eccentric 157 on the end of the shaft 45, as shown in Figs. 1, 2, and 16. Immediately above the scarfing-die 135 and inserted within the slide 140 is a projecting piece 158, Figs. 6 and 8, forming a shaping-die, which comes into contact with the nail at the same time that the scarf is formed and produces a slight curvature of the shank, as is required. After being scarfed, as described, the nail is carried around in its half-die into line with a reciprocating, cutting, and trimming die 160, Figs. 1 and 4, which is adjustably secured to a horizontal slide 161, moving in a suitable guideway in the bed A and actuated by a crank-arm 162, which engages a recess 163 in the under side of the slide 161, as shown in Fig. 4. The crank-arm 162 is secured to a transverse rocker-shaft 164, carrying at its outer end a crank-arm 165, Figs. 1 and 2, the upper end of which is pivotally connected with the long reciprocating bar 153, whereby as said bar is reciprocated by the eccentric 157 the slide 161 is moved toward and away from the base H. The cutting-die 160, which coöperates with a stationary punch 166, secured to the base H, as shown in Fig. 5, is composed of two portions, as shown in Fig. 1, the two cutting edges of which are inclined inward and downward, as shown dotted in Fig. 4, thereby producing with the stationary punch 166 a shearing cut to trim off the surplus metal from the nail to form a perfect point, the piece of metal cut off from the lower portion of the shank being shown in Fig. 30, leaving the shank of the exact shape required for a perfect nail, as shown in Fig. 29. The cutting-die 160 is made adjustable within its carrying-slide by means of a screw 167, as shown in Figs. 1 and 4. As the nail is carried around from the scarfing-die toward the cutting and trimming dies its outer face, just under the head, comes into contact with a curved guide 171, projecting horizontally from a post 172 and extending around in front of the nail, thus serving to hold it firmly within its half-die while being subjected to the action of the trimming-dies, a flat guide-spring 173 at the same time bearing on the head of the nail when opposite to the trimming-dies to keep it down in its proper place within the half-die 48. After being trimmed the nail is carried around by the disk I beyond the end 174 of the band 35, when the lower portion of its shank will ride over the thin end of a flat spring-guide 175, Fig. 5, by which it is loosened and caused to drop out of its half-die 48 into a spout 176, by which it is carried out of the machine. When the machine is in operation, with the half-dies 48 filled with nails, each intermittent movement of the carrier-disk I brings one of said half-dies 48 into position to receive a nail from the nail-conductor 101, while at the same time another nail is being brought into a position to be headed, another one into a position to be scarfed, and another one into a position to be trimmed, while the one previously trimmed and completely finished is being discharged from the machine.

What I claim as my invention, and desire to secure by Letters Patent, is—

1. In a horseshoe-nail-finishing machine, the combination with the intermittently-rotating die-carrying disk provided around its periphery with nail-holding dies, of a reciprocating slide moving in a plane at right angles to the axis of revolution of the die-carrying disk, a holder pivotally connected to said slide and provided with a scarfing-die adapted to act on the nail while being held by the disk die to form a scarf or bevel at its point, an anvil or support for the nail coöperating with said scarfing-die, and means for adjusting said holder toward or away from the anvil to vary the action of the scarfing-die for nails of different thicknesses, substantially as described.

2. In a horseshoe-nail-finishing machine, the combination with the intermittently-rotating die-carrying disk and its dies, of a reciprocating slide arranged at right angles to the axis of revolution of said disk, a frame or holder pivotally connected with said slide, and means for adjusting the same toward and from the die-carrying disk, and a slide provided with a die for forming a scarf or bevel at the point of the nail, said slide being made vertically adjustable in said frame or holder, whereby the scarfing-die may be raised or lowered to vary the distance of the scarf or bevel from the head of the nail, substantially as described.

3. In a horseshoe-nail-finishing machine, the combination with the intermittently-rotating die-carrying disk and its dies, of a reciprocating slide arranged at right angles to the axis of revolution of said disk, a frame or holder pivotally connected with said slide, and means for adjusting the same toward and from the die-carrying disk, a slide provided with a die for forming a scarf or bevel at the point of the nail, and a die located above said scarfing-die for curving the shank of the nail, said slide being made vertically adjustable in said frame or holder, whereby the scarfing-die may be raised or lowered to vary the distance of the scarf or bevel from the head of the nail, substantially as described.

4. In a horseshoe-nail-finishing machine, the combination with the intermittently-rotating die-carrying disk provided around its periphery with nail-holding dies, of a reciprocating slide moving in a plane at right angles to the axis of revolution of the die-carrying disk, and provided with a scarfing-die adjustable vertically within said slide, whereby it may be raised or lowered to vary the distance of the scarf or bevel from the head of the nail, substantially as described.

5. In a horseshoe-nail-finishing machine, the combination with the die-carrying disk and its nail-holding dies, of a reciprocating slide arranged at right angles to the axis of revolution of said disk and provided with an upright head, a frame or holder pivotally connected with said head near its top, means for adjusting said holder toward and away from the die-carrying disk, a slide movable vertically within said holder and provided with a die for forming the scarf or bevel at the point of the nail, means for adjusting said vertically-movable die-slide, a stationary anvil or support for the nail while being acted on by the scarfing-die, and a toggle mechanism for reciprocating the main horizontal slide, substantially as described.

6. In a horseshoe-nail-finishing machine, the combination with the intermittently-rotating die-carrying disk with its nail-holding dies, and a horizontally-reciprocating die coacting with the disk dies to hold the nail while being headed, of a yielding band partially encircling said disk and adapted to hold the nails within said dies, the upper portion of said band which lies opposite to the reciprocating nail-holding dies being of reduced width, leaving a narrow portion at its bottom to hold the nail, whereby the holding-dies are enabled to come into contact with each other in embracing the upper portion of the nail, substantially as described.

7. In a horseshoe-nail-finishing machine, the combination with the intermittently-rotating die-carrying disk and its nail-holding dies, of an upright conductor provided with a yielding device for supporting a nail therein in line with one of said nail-holding dies, means for supporting pendent nails in line and delivering the same singly to the conductor, a reciprocating slide adapted to move transversely across the line of pendent nails beneath their heads and cut out or separate the nail in the conductor from the line of nails behind it, and a vertically-reciprocating nail-pusher located within the conductor and adapted to force the nail down into the nail-holding die of the rotating disk beneath, substantially as described.

8. In a horseshoe-nail-finishing machine, the combination with the intermittently-rotating die-carrying disk and its nail-holding dies, of an upright conductor provided with a yielding device for supporting a nail therein in line with one of the nail-holding dies, means for supporting pendent nails in line and delivering the same singly to the conductor, a vertically-reciprocating nail-pusher located within the conductor, and means for actuating the same, a reciprocating slide adapted to move transversely across the line of pendent nails beneath their heads and cut out or separate the nail within the conductor from the line of nails behind it, and means controlled by the nail-pusher for actuating the cut-out slide, whereby the latter is withdrawn as the nail-pusher reaches the limit of its upward movement to permit of the entrance of a nail into the conductor beneath the lower end of the nail-pusher, substantially as described.

9. In a horseshoe-nail-finishing machine, the combination with the intermittently-rotating die-carrying disk and its nail-holding dies, of an upright conductor provided with a pair of spring-jaws for catching the nail and holding it suspended by the head in line with one of the nail-holding dies beneath, a vertically-reciprocating nail-pusher connected with a slide moving on the outside of the conductor, and means for actuating said slide, means for supporting pendent nails in line and delivering the same singly to the conductor, a reciprocating slide adapted to separate or cut out the nail within the conductor from the line of nails behind it and actuated in one direction by a spring and lever mechanism controlled by the nail-pusher slide for actuating the cut-out slide, whereby the latter is withdrawn on the ascent of the nail-pusher to permit of the passage of a nail into the conductor beneath the lower end of the nail-pusher, substantially as described.

10. In a horseshoe-nail-finishing machine, the combination with the intermittently-rotating die-carrier and its nail-holding dies, and the upright nail-conductor, of a yielding spring-band adapted to lie against each nail-holding die as it is brought around into line therewith and close the open side of the recess therein, and a guide secured to said yielding band and located between the lower end of the conductor and the die, whereby the nail is properly guided into the die-recess, substantially as described.

11. In a horseshoe-nail-finishing machine, the combination with the intermittently-rotating die-carrier and its nail-holding dies, and the dies for trimming the point of the nail, of guides adapted to bear on the top of the head of the nail and against its front side when in line with said trimming-dies to hold it firmly in position while the point is being trimmed, substantially as described.

Witness my hand this 11th day of April, A. D. 1900.

HENRY ALEXIS WILLIAMS.

In presence of—
A. H. RICKERLY,
HELEN F. RHOADES.